United States Patent [19]
Kajiura

[11] Patent Number: 5,899,763
[45] Date of Patent: May 4, 1999

[54] DATA PROCESSING MEDIUM CONNECTOR WITH LOCKING MEANS

[75] Inventor: Motomu Kajiura, Tokyo, Japan

[73] Assignee: Berg Technology, Inc., Reno, Nev.

[21] Appl. No.: 08/640,762

[22] PCT Filed: Nov. 17, 1994

[86] PCT No.: PCT/US94/13429

§ 371 Date: Jul. 10, 1996

§ 102(e) Date: Jul. 10, 1996

[87] PCT Pub. No.: WO95/14317

PCT Pub. Date: May 26, 1995

[30] Foreign Application Priority Data

Nov. 19, 1993 [JP] Japan ................................ 5-062438 U
Mar. 25, 1994 [JP] Japan ..................................... 6-55761

[51] Int. Cl.⁶ .................................................. H01R 13/62
[52] U.S. Cl. ............................................................ 439/159
[58] Field of Search ..................................... 439/152–159, 439/327, 372

[56] References Cited

U.S. PATENT DOCUMENTS

4,887,188 12/1989 Yosluda et al. ......................... 361/413
5,033,972 7/1991 Komatsu et al. ........................ 439/153
5,179,505 1/1993 Matsuo .................................... 439/159
5,324,204 6/1994 Lwee ........................................ 439/64
5,451,168 9/1995 Shuey ...................................... 439/159
5,564,936 10/1996 David et al. ............................ 439/159
5,573,413 11/1996 David et al. ............................ 439/159

*Primary Examiner*—Paula Bradley
*Assistant Examiner*—Tho D. Ta
*Attorney, Agent, or Firm*—Woodcock Washburn Kurtz Mackiewicz & Norris LLP

[57] ABSTRACT

A connector apparatus for a card-like data processing medium has an ejection mechanism for discharging the card-like data processing medium from the connector apparatus. The ejection mechanism comprises a slidable plate that is movably mounted on a frame of the connector apparatus and has a pawl that engages with a forward end face of the card-like data processing medium. The slidable plate slides back and forth in a plane that is substantially parallel to a plane defined by the frame in order to eject the card-like data processing medium. A pivotal lever for transmitting movement of a push rod into movement of the slidable plate is rotatably mounted on the frame in the same plane as the slidable plate, thereby reducing the profile of the connector apparatus. In an alternate embodiment, the pivotal lever is replaced by a plurality of gears that transmit movement of the push rod into movement of the slidable plate.

11 Claims, 7 Drawing Sheets

DATA PROCESSING MEDIUM CONNECTOR WITH LOCKING MEANS

BACKGROUND

1. Field of the Invention

The present invention generally relates to a connector and, more particularly, to a data processing medium connector for connecting a data processing medium, e.g., an IC card, a hard disk drive package, and the like to a data processing apparatus, e.g., a personal computer, peripheral equipment thereof, and the like, in order to execute data communication between the data processing medium and the data processing apparatus. Furthermore, the present invention also relates to a data processing medium locking mechanism which is used in the connector of the above-mentioned type to lock the data processing medium in the connector.

2. Description of the Prior Art

One of the known connectors for connecting a card type data processing medium (typically a memory card) to a data processing apparatus (typically a personal computer) is disclosed in Japanese Utility Model Application No. 2-90772 (corresponding to U.S. Pat. No. 5,152,697). This connector has such a size that it can be mounted in, e.g., the expansion slot of a personal computer. This connector has a housing for housing a memory card, and a releasing mechanism for releasing connection of the connector and the memory card from each other.

The housing has open and closed ends opposing each other, and a housing space for housing the memory card is defined between the open and closed ends. This housing is generally formed as a frame member made of a plastic, and its upper portion is covered with a metal reinforcing plate for imparting a strength to the frame member. The open end of the housing is arranged at the open side of the expansion slot of the personal computer so that the memory card can be inserted and removed therethrough. A plurality of male contact terminals are arranged at the closed end of the housing. One end of each male contact terminal extends from the closed end to the outside of the housing and is connected to the circuit substrate in the personal computer. The other end of each male contact terminal is arranged to oppose the open end in the housing and is formed such that it can be connected to a corresponding female contact terminal of the memory card.

The releasing mechanism includes a slidable plate slidable on the reinforcing plate of the housing in the moving direction of the memory card, a pivotal lever for driving the slidable plate, and a push rod for manually operating the pivotal lever. The slidable plate has a pawl engageable with the memory card in the housing through a notch in the reinforcing plate of the housing. One end of the pivotal lever is coupled to the slidable plate on the reinforcing plate of the housing, and the central portion of the pivotal lever is axially mounted to the reinforcing plate of the housing. The other end of the pivotal lever is coupled to the push rod mounted on a side surface of the housing. The push rod is manually reciprocally movable in the moving direction of the memory card. Accordingly, when the reciprocal movement of the push rod is transmitted to the slidable plate through the pivotal lever, the slidable plate is reciprocally moved.

The pivotal lever is formed such that it converts the movement of the push rod in the opposite direction and transmits it to the slidable plate.

When the memory card is completely inserted from the open end toward the closed end of the housing and the female terminals of the memory card are connected to the male terminals of the connector, since the pawl of the slidable plate is engaged with the memory card, the slidable plate is also moved toward the closed end side of the housing. When this movement is transmitted to the push rod through the pivotal lever, the push rod is withdrawn from the open end side of the housing. On the contrary, when the push rod is pushed in toward the closed end of the housing, the slidable plate and the memory card are moved toward the open end side of the housing, and accordingly the female terminals of the memory card and the male terminals of the connector are disconnected from each other.

The computer industry continues to strive toward low profile data processing apparatus, e.g., personal computers, peripheral equipment, and the like. As a consequence, there is a need to reduce the profile of memory card connectors intended for use in such low profile computing apparatus. Furthermore, any such low-profile connector should be easy to operate and should have data security features in order to prevent damage to circuit elements, e.g., memory elements, and loss of data in the event of an unexpected accident, such as inadvertent ejection of a memory card from the connector.

Size design of the conventional connector described above will be discussed. First, from the viewpoint of the thickness of the connector, three metal plates, i.e., the reinforcing plate of the housing, the slidable plate of the releasing mechanism, and the pivotal lever, are located above the memory card, thus preventing the realization of a low profile connector. Second, from the viewpoint of the length of the connector (the moving direction of the memory card), the stroke length of the push rod projecting outward from the open end of the housing is too long, further hampering efforts to achieve a low-profile connector.

From the viewpoint of operation of the conventional connector described above, while data communication is performed between the memory card and the data processing apparatus, the push rod projects beyond the open end of the housing. In such an extended position, the push rod can be pushed in accidentally by an operator. Additionally, unexpected vibrations or shocks to the computing apparatus could cause a memory card to back out of and disconnect from the connector. When any of these accidents occur, the circuit elements in the memory card can be damaged, and data in the circuit elements can be lost.

SUMMARY OF THE INVENTION

It is, therefore, an object of the present invention to provide a data processing medium connector that realizes a lower profile.

It is another object of the present invention to provide a data processing medium connector having safety features that prevent inadvertent removal of the data processing medium due to operator error or some unexpected vibration or shock to the connector apparatus.

It is still another object of the present invention to provide a data processing medium locking mechanism capable of locking a data processing medium in the connector even when an erroneous operation of the operator or some unexpected vibration or shock occurs.

According to the present invention, these and other objects are achieved in a connector apparatus comprising a frame having opposing side rails spaced at an interval substantially equal to a width of the card-like data processing medium for guiding the card-like data processing medium during insertion into the connector apparatus. A header is coupled to the frame and has a plurality of contact terminals arranged to connect with the card-like data processing medium when the medium is fully inserted into the connector apparatus. A slidable plate is movably mounted on the frame in a plane substantially parallel to a plane defined by the frame. The slidable plate is operable to slide toward and away from the header and has at least one pawl adapted to engage a forward end face of the card-like data processing medium. A push rod is slidably mounted on one of the side rails of the frame and is capable of sliding lengthwise of the one side rail toward and away from the header. A pivotal lever is rotatably mounted on the frame. One end of the pivotal lever is coupled to the slidable plate and the other end of the pivotal lever is coupled to the push rod. Consequently, movement of the push rod in one direction is translated through rotation of the pivotal lever into movement of the slidable plate in an opposite direction. According to an important feature of the present invention, the pivotal lever is mounted, and therefore rotates, in substantially the same plane as the slidable plate. Because these two plates lie in the same plane, the overall height of the connector apparatus is reduced and a lower profile is achieved.

Preferably, the push rod does not project from either the open end or the closed end of the frame as the push rod moves lengthwise of the side rail of the frame toward and away from the header. This further ensures a low-profile connector apparatus. The frame of the connector apparatus is preferably U-shaped.

The connector apparatus of the present invention further comprises means for locking the push rod in place to prevent movement of the push rod, and consequently, to prevent inadvertent ejection of the card-like data processing medium from the connector apparatus. The locking means comprises an operating member for manually moving and operating the locking means. In a preferred embodiment, the push rod also has an operating member and both the operating member of the locking means and the operating member of the push rod are located on the same side rail of the frame. The locking means and the push rod are both operated by sliding the respective operating members lengthwise of the side rail toward and away from the header. By placing both operating members on the same side of the connector apparatus, the locking and ejecting functions can be performed by an operator using one hand.

In an alternate embodiment, the pivotal lever is replaced by gear transmitting means for transmitting movement of the push rod to the slidable plate through at least one gear. Preferably, the at least one gear comprises a first gear and a second gear, the first gear being concentrically and fixedly attached to the second gear. In this embodiment, the ear transmitting means comprises a first worm gear disposed on the slidable plate and engaged with the first gear, and a second worm gear disposed on the push rod and engaged with the second gear. Movement of the push rod is transmitted through the first and second gears and the first and second worm gears into movement of the slidable plate. The gear ratio can be adjusted to shorten the stroke length of the push rod to ensure that the push rod does not project past the ends of the connector apparatus during is operation stroke. Additionally, the gear ratio can be set to require a certain force in order to eject a data processing medium from the connector apparatus, thereby reducing the likelihood of inadvertent ejection.

It is understood that the terms "data processing medium" and "card-like data processing medium" used herein include not only mediums for storing data, but also interfaces and the like that convert data communicated between, e.g., two data processing apparatuses. Moreover, "discharge" or "ejection" of the data processing medium does not necessarily mean that the entire data processing medium is discharged from the connector apparatus, but means a state wherein electrical and mechanical connections of the connector and the data processing medium are released, no matter how slightly.

These and other object and advantages of the present invention will become evident hereafter.

DETAILED DESCRIPTION OF THE PREFERRED EMBODIMENTS

Figure 1:
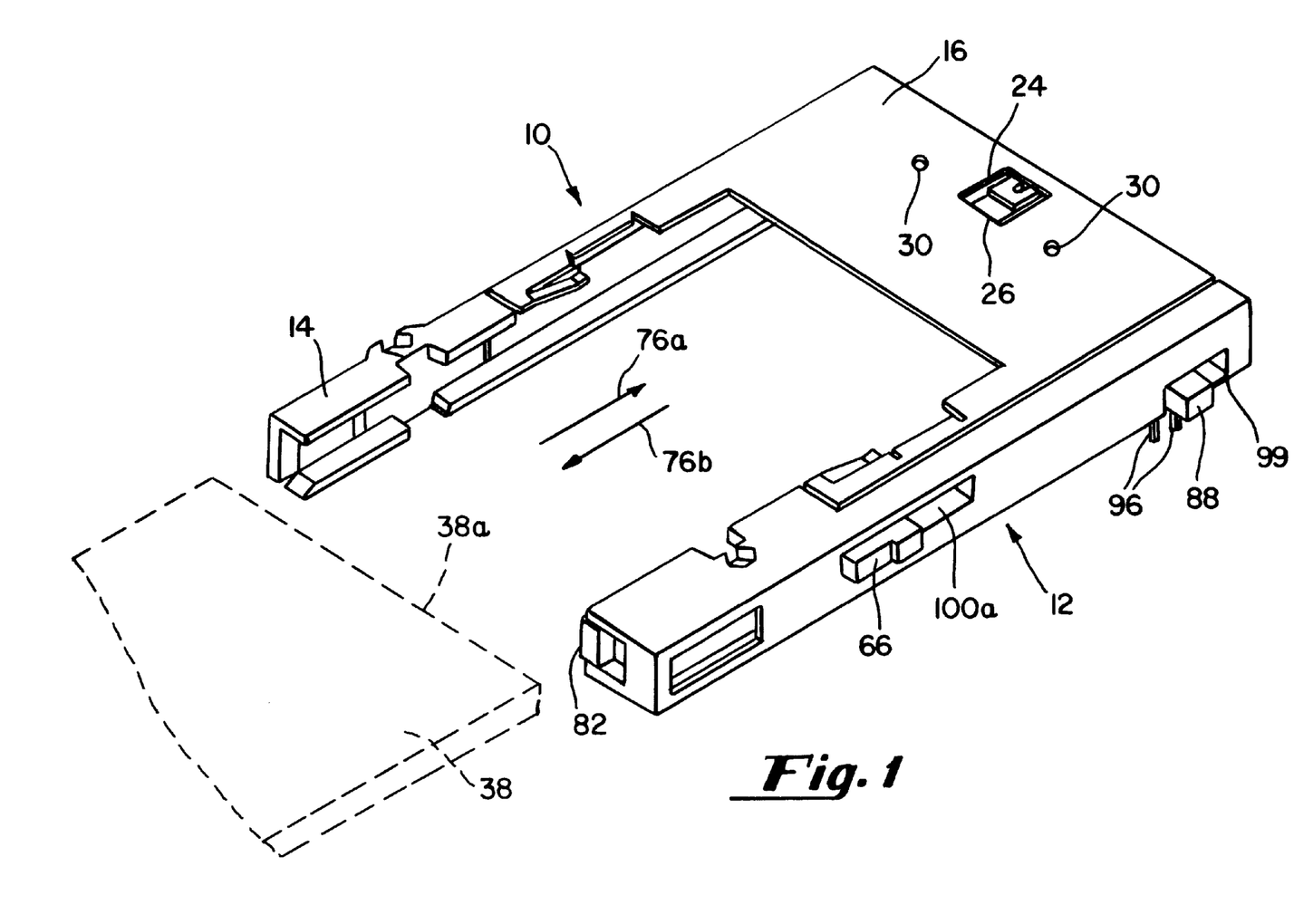
FIG. 1 is a perspective view of a data processing medium connector according to a first embodiment of the present invention.
Figure 2:
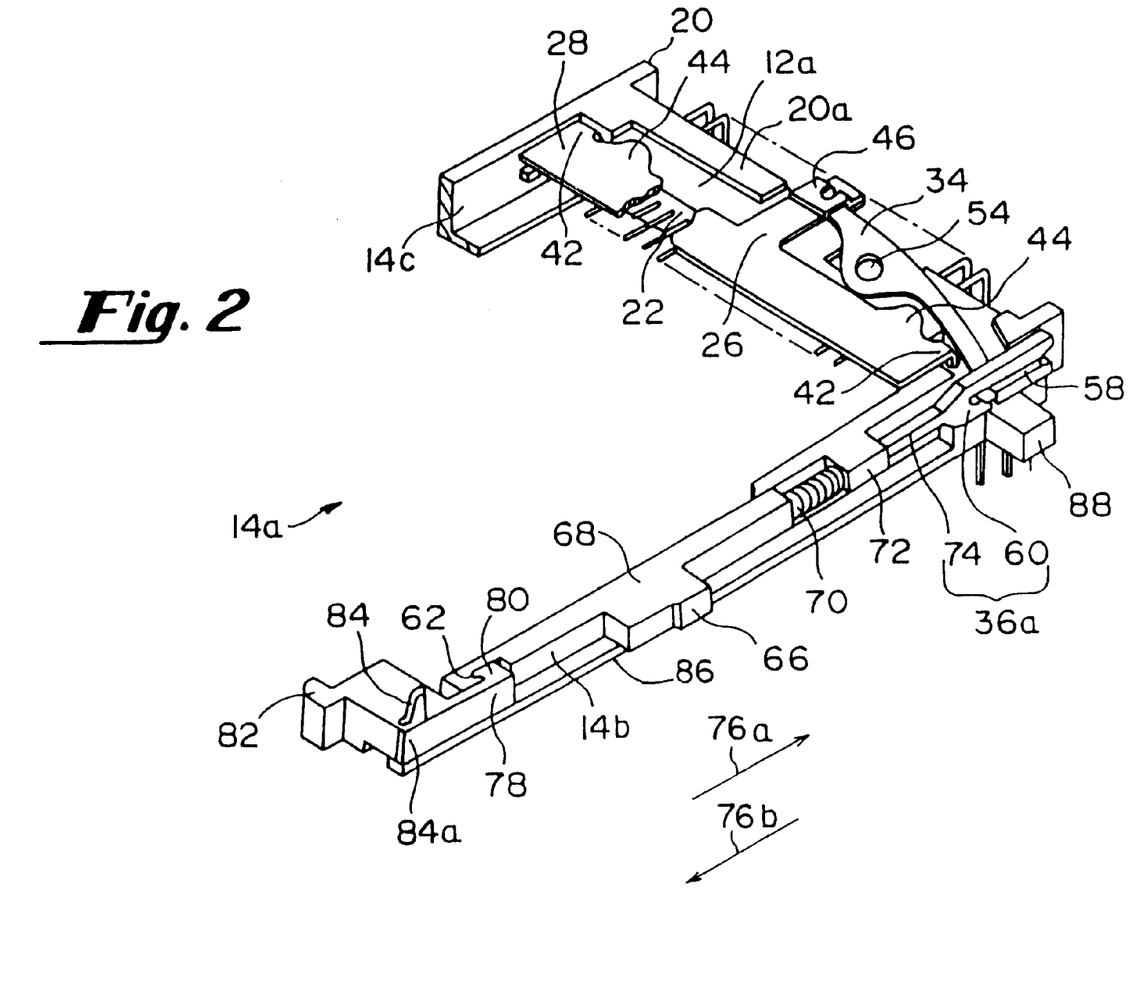
FIG. 2 is a perspective view of the connector shown in FIG. 1 with a reinforcing plate removed in order to clearly show the internal structure thereof.
Figure 3:
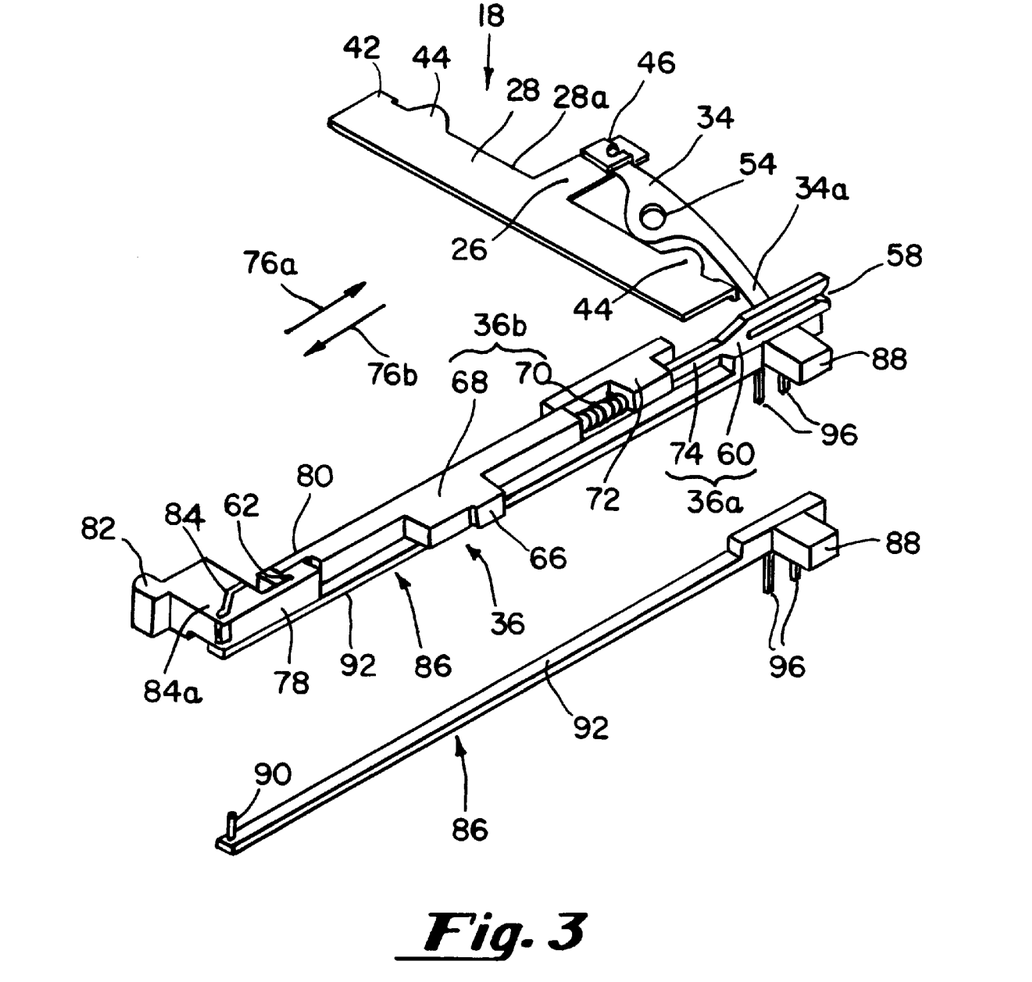
FIG. 3 is a perspective view showing a releasing mechanism and a switch mechanism of the connector shown in FIG. 1, and includes a separate view of the switch mechanism.

Referring to FIGS. 1 to 3, a connector 10 according to the present invention has a housing 12, constituted by a plastic frame 14 and a stainless steel reinforcing plate 16, and a releasing mechanism 18 and a header 20 mounted to the housing 12. Such a connector 10 is generally housed in a data processing apparatus (not shown), e.g., a personal computer, its peripheral equipment, or the like, with its reinforcing plate 16 facing upward.

The frame 14 of the housing 12 is formed in a substantially U-shaped manner, and the header 20 where a plurality of male contact terminals 22 are arranged is mounted to the closed end of the frame 14. An open end 14a of the frame 14 forms an opening of the housing 12 for receiving a memory card 38 into the housing 12. Accordingly, the closed end, the opening 14a, and two side rails 14b of the frame 14 of the housing 12 define a storage space for housing the memory card 38. In the following description, the header 20 side (the closed end side of the housing 12) of the connector 10 is the forward portion of the connector 10, and the open end 14a side of the connector 10 is the rear portion of the connector 10. Guides 14c for guiding the memory card 38 to the header 20 are formed in the inner surfaces of the two side rails 14b of the frame 14. The width between the pair of the guides 14c is set to be slightly larger than the width of the memory card 38 so that the guides 14c can smoothly guide the memory card. A plurality of female contact terminals (not shown) corresponding to the plurality of male contact terminals 22 of the header 20 are arranged on a front end face 38a of the memory card 38.

The substantially horizontal reinforcing plate 16 of the housing 12 is fixed to the frame 14 and the header 20 at the closed end side of the frame 14. For example, the reinforcing plate 16 is fixed to the frame 14 and the header 20 by fitting small projections (not shown) formed on the upper surfaces of the frame 14 and the header 20 into small holes (not shown) formed in the reinforcing plate 16. A notch 24 is formed at the central portion of the reinforcing plate 16, and an engaging portion 26 of a slidable plate 28 (to be described later) is engaged with this notch 24. On the upper surface of the reinforcing plate 16, at least one, and preferably a pair of small-diameter engaging cylinders 30 project in the vicinity of the notch 24. In this embodiment, the pair of engaging cylinders 30 project at symmetrical positions with respect to the notch 24, i.e., the notch 24 is sandwiched between them when seen from the widthwise direction of the reinforcing plate 16. A pivotal lever 34 of the releasing mechanism 18 can be axially mounted to one or the other engaging cylinder 30 in a manner to be described later. Therefore, when a pair of engaging cylinders 30 are provided, as in this embodiment, the pivotal lever(s) 34 can be mounted on the left and/or right side of the housing 12.

Figure 4:
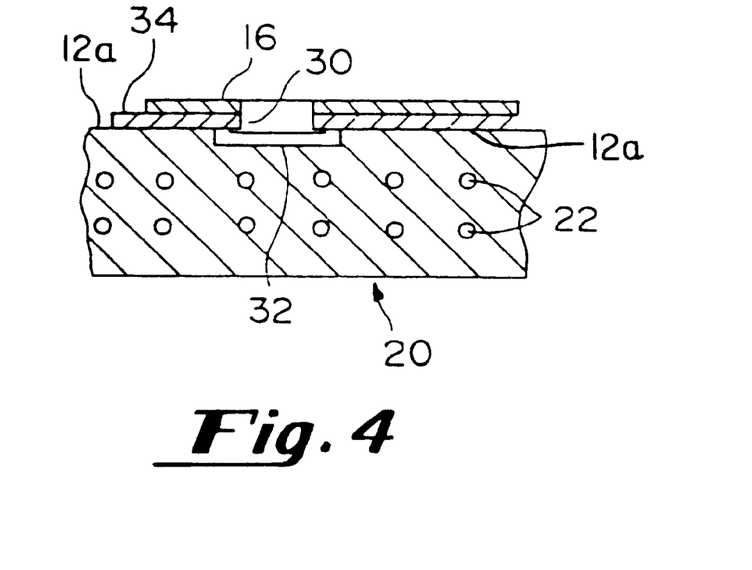
FIG. 4 is a sectional view showing the structure of an engaging cylinder of the connector shown in FIG. 1.

As shown in FIG. 4, each engaging cylinder 30 is made by drawing the reinforcing plate 16, thereby forming a circular cylinder extending downwardly below the surface of the reinforcing plate 16. An upper surface 20a of the header 20 as recessed portions 32 formed opposite each engaging cylinder 30 to prevent interference between the engaging cylinders 30 and the header 20.

FIGS. 2 and 3 show the connector 10 from which the reinforcing plate 16 has been removed in order to clarify the structure of the releasing mechanism 18 of the connector 10. In FIG. 2, most of the frame 14 is removed as well, and in FIG. 3, the frame 14 and the header 20 are also removed.

The releasing mechanism 18 comprises a slidable plate 28, a pivotal lever 34, and a push rod 36. The slidable plate 28 for discharging the memory card 38 through the housing opening 14a is made of a stainless steel plate having a thickness t. This slidable plate 28 is arranged below the reinforcing plate 16 and lies in a plane substantially parallel to the plane of the reinforcing plate 16. The slidable plate 28 is slidable between the reinforcing plate 16 and an intermediate plane 12a of the housing 12 (to be described later) in a moving directions 76a and/or 76b of the memory card 38. The two ends of a front end face 28a of the slidable plate 28 has a pair of pawls 42 formed on opposite sides of a front end face 28a of the plate 28. The pawls 42 engage with the front end face 38a of the memory card 38 in order to discharge the memory card 38 through the housing opening 14a. The pawls 42 are bent downward from a major flat surface 28b of the slidable plate 28 substantially vertically. The vicinities of the pawls 42 of the slidable plate 28 have a pair of projecting portions 44 projecting further forward from the front end face 28a of the slidable plate 28. These projecting portions 44 are formed such that they prevent removal of the two side portions of the slidable plate 28 from the intermediate plane 12a of the housing 12 when the slidable plate 28 is slid in forward and backward directions 76a and 76b. Projecting portions 44 help maintain the orientation of slidable plate 28 relative to intermediate plane 12a by providing a deeper surface of plate 28 along directions 76a and 76b for contacting adjacent parts, including reinforcing plate 16. An engaging portion 26 to be engaged with the pivotal lever 34 projects from the central portion of the front end face 28a of the slidable plate 28. A portion of the engaging portion 26 which is engaged with the pivotal lever 34 forms an offset portion. 46 offset from the major flat surface 28b of the slidable plate 28. The offset portion 46 is shown in FIG. 5 in detail.

Figure 5:
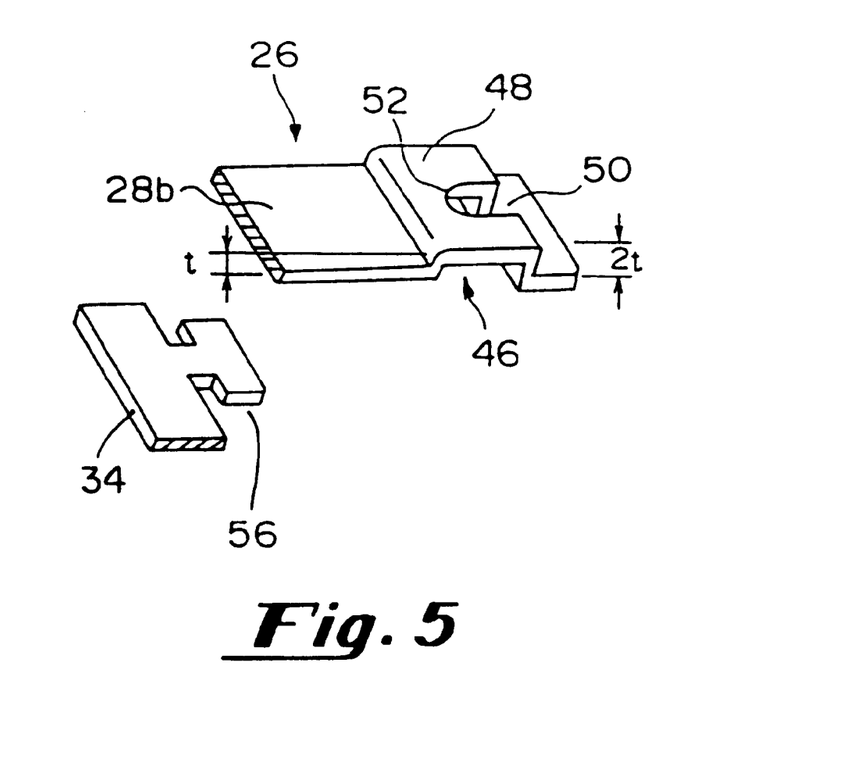
FIG. 5 is an enlarged perspective view partially showing the offset portion of the slidable plate and the distal end portion of the pivotal lever of the connector shown in FIG.

Referring to FIG. 5, when the offset portion 46 is viewed in a section along its rear to front portion, it is first bent upward from the major flat surface 28b of the slidable plate 28 for the thickness t, and then extends as a high surface 48 (having a height 2t from the bottom surface of the slidable plate 28 and a height, t, from the major flat surface 28b of the slidable plate 28) to be parallel to the major flat surface 28b. Subsequently, the offset portion 46 is bent downward from the high surface 48 for 2t and extends as a low surface 50 (having a height t from the bottom surface of the slidable plate 28 and a height t from the major flat surface 28b of the slidable plate 28) to be parallel to the major flat surface 28b. A notch 52 is formed at the front central portion of the high surface 48 of the offset portion 46. The width of the notch 52 is slightly larger than the plate thickness of the pivotal lever 34. The pivotal lever 34 in this embodiment is formed of a stainless steel plate having a thickness t in the same manner as the slidable plate 28.

The pivotal lever(s) 34 of the releasing mechanism 18 of the connector 10 can be mounted on the right and/or left side of the housing 12. In this embodiment, the pivotal lever 34 is mounted to the right side of the housing 12. An engaging hole 54 is formed in the central portion of the pivotal lever 34. When the corresponding engaging cylinder 30 of the reinforcing plate 16 of the housing reinforcing plate 16 is inserted in this engaging hole 54, the pivotal lever 34 is axially mounted to the housing reinforcing plate 16 so that it pivots in a plane substantially parallel to, but below, the plane of the reinforcing plate 16. A T-shaped portion 56 projecting toward the front of the connector 10 is formed on one end of the pivotal lever 34. This T-shaped portion 56 is engaged with the notch 52 in the offset portion 46 of the engaging portion 26 of the slidable plate 28. The other end portion 34a of the pivotal lever 34 is bent downward substantially vertically and then bent substantially horizontally. The distal end of the other end portion 34a of the pivotal lever 34 is engaged with a lever engaging groove 58 (to be described later) at the distal end of the push rod 36. The pivotal lever 34 is disposed in a plane between the reinforcing plate 16 and the intermediate plane 12a of the housing 12.

The push rod(s) 36 of the releasing mechanism 18 of the connector 10 can be mounted to right and/or left side of the housing 12 in the widthwise direction. In this embodiment, the push rod 36 is mounted to the right side of the housing 12. The push rod 36 comprises a front portion 36a including a forked member 60 and a linear member 74 continuous to the forked member 60, and a rear portion 36b formed separately of the front portion 36a and including an operating member 68 and a coil spring 70.

The forked member 60 forming the front end of the front portion 36a of the push rod 36 forms a fork substantially parallel to the height direction of the housing 12. The lever engaging groove 58 in which the other end portion 34a of the pivotal lever 34 is engaged is defined in the forked member 60, and an engaging recessed portion 62 recessed toward the inner side of the housing 12 in the widthwise direction is formed in the rear end of the rear portion 36b (rear end of the operating member 68) of the push rod 36. A lock member 78 for locking the memory card 38 is engaged with the engaging recessed portion 62, as will be described later.

The operating member 68 is designed to be suitable for a manual operation of the push rod 36, and typically has a knob 66 projecting externally from the housing 12 in the widthwise direction. The coil spring 70 is arranged between the front portion 36a and the operating member 68 of the push rod 36. The distal end of the coil spring 70 is fixed to a hollow projection 72 of the frame 14, and the rear end thereof abuts against the front end of the operating member 68. The coil spring 70 and the operating member 68 form the rear portion 36b of the push rod 36, as described above.

A guide hole (not shown) having a smaller diameter than the coil diameter of the coil spring 70 and the diameter of the forked member 60 is formed in the hollow projection 72 of the frame 14 in the forward-backward direction of the housing 12. The linear member 74 continuous to the forked member 60 is inserted in this guide hole of the hollow projection 72 of the frame 14 and can move freely in the guide hole in the forward and backward directions 76a and 76b of the housing 12.

The push rod 36 as described above is always pushed in the backward direction 76b by its coil spring 70. The substantially L-shaped lock member 78 for locking the memory card 38 is arranged in the vicinity of the rear end of the rear portion 36b (the rear end of the operating member 68) of the push rod 36. The front end of the lock member 78 has a projection 80 formed to be engageable with the engaging recessed portion 62 of the operating member 68. The rear end of the lock member 78 has a hook 82 for locking the rear end of the memory card 38. A guide groove 84 for receiving a lock member driving projection 90 of a switch mechanism 86 (to be described later) extends from the outer corner of the lock member 78 toward substantially the center of the lock member 78. This guide groove 84 forms a predetermined acute angle (e.g., 45°) with the forward and backward moving directions 76a and 76b of the push rod 36. The lock member driving projection 90 can move in the guide groove 84, and the lock member 78 moves in the widthwise direction of the housing 12 in response to the movement of the lock member driving projection 90. A recessed standby portion 84a for having the lock member driving projection 90 of the switch mechanism 86 stand by extends in a portion of the guide groove 84 in the vicinity of the outer corner of the lock member 78.

FIG. 2 shows a state wherein the lock member driving projection 90 is located at the recessed standby portion 84a. In this state, the projection 80 of the lock member 78 is engaged with the engaging recessed portion 62 of the operating member 68 of the push rod 36 to lock the push rod 36, and the hook 82 projects toward the center of the housing 12 in the widthwise direction.

On the contrary, when the projection 90 of the switch mechanism 86 moves from the recessed standby portion 84a, the lock member 78 moves in a direction to be apart from the operating member 68 of the push rod 36, and engagement of the projection 80 of the lock member 78 and the engaging recessed portion 62 of the operating member 68 is released. Thus, the hook 82 of the lock member 78 is withdrawn into the side rail 14b on which the push rod 36 is mounted. At this time, the locked push rod 36 is unlocked, so that it can be freely moved.

The guide groove 84 and the recessed standby portion 84a do not necessarily extend fully in the vertical direction of the lock member 78, and it suffices if they are formed at least on the lower surface of the lock member 78.

The linear switch mechanism 86 extending substantially in the moving directions 76a and 76b of the push rod 36 is arranged under the push rod 36 and the lock member 78 to be slidable in the directions 76a and 76b.

Referring to FIG. 3, the switch mechanism 86 includes a substantially T-shaped lever 88 at its front end, the lock member driving projection 90 at its rear end, and an elongated transmission shaft 92 for coupling the lever 88 and the projection 90 to each other and transmitting movement of the lever 88 to the projection 90. The lever 88, the projection 90, and the transmission shaft 92 are integrally formed of a plastic by injection molding.

The lock member driving projection 90 of the switch mechanism 86 extends substantially vertically upward at the rear end of the transmission shaft 92 and has, e.g., a pin shape. This projection 90 enters the guide groove 84 of the lock member 78 from the lower side of the lock member 78 and can move along the guide groove 84 in response to the slidable operation of the knob 66 of the operating member 68 of the push rod 36, i.e., movement of the push rod 36 in the directions 76a and 76b.

Figure 6:
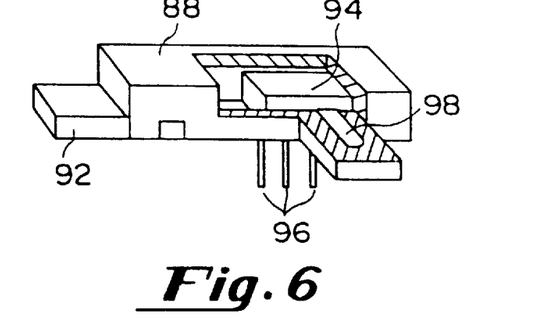
FIG. 6 is a partially cutaway perspective view showing further details of the switch mechanism shown in FIG. 3.

Especially, as shown in FIG. 6, a known switch 94 having three conductive pins 96 is buried in the plastic lever 88 of the switch mechanism 86. Note that the three pins 96 project downward from the lever 88. This switch 94 has a conductive switching lever 98. When the switching lever 98 is moved in the direction 76a or 76b, of the three pins 96, two adjacent pins 96 are electrically conducted through the conductive lever 98, thereby turning on/off the switch 94. Since the switch 94 is fixed while the plastic lever 88, transmission shaft 92, and conductive lever 98 (which is buried in the plastic lever 88) are contiguously formed to move together, the switch 94 is turned on/off in accordance with the movement of the plastic lever 88. The ON/OFF state of the switch 94 is electrically transmitted to the data processing apparatus through the pins 96 in a known manner.

Referring to FIG. 1 again, windows 99 and 100 are formed in one of the two side rails 14b of the frame 14 of the housing 12, to which the push rod 36 is mounted. The plastic lever 88 of the switch mechanism 86, and the knob 66 of the operating member 68 of the push rod 36 project respectively to the outside of the housing 12 through these windows. The rear end face of the hook 82 of the lock member 78 is flush with the end face of the housing opening 14a.

The operation of the connector 10 as described above will be further clarified by the following description made with reference to FIGS. 1 to 3.

(i) First, the operator begins to manually insert the memory card 38 into the housing 12 through the housing opening 14a along the guides 14c. It is possible, however, that the hook 82 of the lock member 78 projects into the housing 12 and thus blocks the memory card 38 from being inserted. If this is the case, the operator slides the plastic lever 88 of the switch mechanism 86 in the forward direction 76a. This causes the pin projection 90 of the switch mechanism 86 to move in the guide groove 84 of the lock member 78 in a direction away from the recessed standby portion 84a. As a result, the lock member 78 slides to the side such that the hook 82 of the lock member 78 is withdrawn from the opening 14a of the housing 12. The card 38 can then be inserted into the connector housing 12. It is understood that this step is not necessary if, upon insertion of the memory card 38, the lock member 78 is already in its withdrawn position.

(ii) When the memory card 38 is completely inserted into the housing 12, i.e., when the female contact terminals of the memory card 38 are electrically connected to the corresponding male contact terminals of the header 20 of the connector 10, the operator slides the plastic lever 88 in the backward direction 76b. In response to this operation, the pin projection 90 moves in the guide groove 84 of the lock member 78 toward the recessed standby portion 84a, so that the hook 82 of the lock member 78 moves toward the center of the housing 12 in the widthwise direction and abuts against the rear end face of the memory card 38. This prevents removal of the memory card 38 from the housing 12. Also, the projection 80 of the lock member 78 engages with the engaging recessed portion 62 of the operating member 68 of the push rod 36, thereby locking the push rod 36 in place. Accordingly, in this state, the push rod 36 does not move even if the operator erroneously tries to eject the memory card 38, or even if an unexpected vibration or shock is applied to the push rod 36. The memory card 38 therefore cannot be undesirably discharged from the connector. This reduces the risk of damage to circuit elements, e.g., memory elements, mounted in the memory card 38, and reduces the risk of loss of data stored in the memory card.

When the plastic lever 88 is slid in the backward direction 76b, the conductive lever 98 of the switch 94 of the switch mechanism 86 also moves simultaneously. Thus, the switch 94 is turned on to transmit an electrical signal, indicating that the memory card 38 is locked, to the data processing apparatus through the conductive pins 96. The data processing apparatus receives this signal and initiates data communication with the memory card 38. Processing of the electrical signal is achieved by a program supplied to the data processing apparatus in advance. The electrical signal can be used in any manner by the data processing apparatus, and therefore, further details of the electrical signal, the program of the data processing apparatus, and the processing of the electrical signal by the program are neither necessary, nor limiting.

(iii) The memory card 38 can be ejected from the housing 12 whenever desired. More specifically, when electrical connection of the memory card 38 and the header 20 is to be released, the operator slides the plastic lever 88 in the forward direction 76a. In response to this operation, the lock member 78 is retracted into the side rail 14b so that the hook 82 of the lock member 78 is withdrawn, thereby unlocking the locked memory card 38. Simultaneously, engagement of the projection 80 of the lock member 78 and the engaging recessed portion 62 of the operating member 68 of the push rod 36 is also released, thereby unlocking the locked push rod 36.

(iv) Subsequently, the operator slides the knob 66 of the operating member 68 of the push rod 36 in the forward direction 76a against the coil spring 70. As a result, the lever engaging groove 58 of the forked member 60 of the push rod 36 is engaged with the other end portion 34a of the pivotal lever 34 of the releasing mechanism 18, i.e., the forked member 60 clamps the other end portion 34a of the lever to push the other end portion 34a of the lever in the forward direction 76a. Then, the pivotal lever 34 is pivoted counterclockwise in FIG. 1 about the engaging hole 54 by a certain angle. As a result, the T-shaped portion 56 at one end of the pivotal lever 34 is engaged with the notch 52 in the offset portion 46 of the engaging portion 26 of the slidable plate 28 to push the slidable plate 28 in the backward direction 76b. In response to the movement of the slidable plate 28 in the backward direction 76b, the pawls 42 of the slidable plate 28 push the front end face 38a of the memory card 38 in the backward direction 76b (toward the housing opening 14a), thereby ejecting the memory card through the housing opening 14a.

One advantage of the operation of the above connector 10 is that the knob 66 and the plastic lever 88 of the connector 10 are located on the same side surface of the housing 12. A second advantage is that the moving directions of both the knob 66 and the plastic lever 88 for locking and unlocking the memory card are only the forward and backward directions 76a and 76b of the housing 12. Thus, an operator can easily operate the knob 66 and the plastic lever 88 with one hand and without substantially changing the position of the hand. Moreover, the fact that all of the inserting, locking, and unlocking operations of the memory card 38 can be executed in the same direction must be noted as another useful advantage of the present invention.

In addition to the foregoing advantages, the connector 10 of the present invention has an extremely low-profile. The low-profile is achieved in large part by the arrangement of the re-enforcing plate 16, the slidable plate 28 and the pivotal lever 34, as described hereinafter.

Referring to FIG. 2 in accordance with the present invention, the pivotal lever 34 is located behind the slidable plate 28 on the same plane. More specifically, the lower surfaces of the slidable plate 28 and the pivotal lever 34 both contact and glide over the plane defined by the intermediate surface 12a of the header 20, which is slightly lower than the upper surface 20a of the header 20. Thus, the slidable plate 28 and the pivotal lever 34 are located on the same plane 12a. The height difference between the upper surface 20a of the header 20 and the intermediate plane 12a corresponds to the plate thickness t of each of the slidable plate 28 and the pivotal lever 34. Since the reinforcing plate 16 of the housing 12 is arranged to contact the upper surfaces of the slidable plate 28 and the pivotal lever 34, the slidable plate 28 slides and the pivotal lever 34 pivots in the space between the reinforcing plate 16 and the intermediate plane 12a. As described above, the slidable plate 28 has a high surface 48 (with a height 2t from the bottom surface of the slidable plate 28) at its offset portion 46. Since the high surface 48 is located in the notch 24 of the reinforcing plate 16 of the housing 12, it does not influence the size of the housing 12 in the height direction. Accordingly, only the two metal plates including the slidable plate 28 (or the pivotal lever 34) and the reinforcing plate 16 are located above the memory card 38, and the thickness of the connector is thus decreased as compared to the case of the conventional connector wherein three metal plates are located above the memory card 38.

Figure 7:
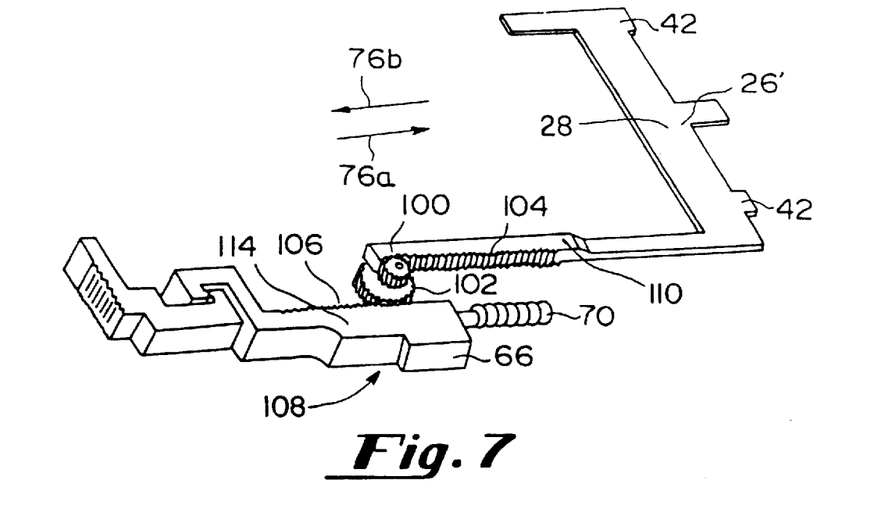
FIG. 7 is a perspective view showing a transmission mechanism between the push rod and the slidable plate of the data processing medium connector according to a second embodiment of the present invention.
Figure 8:
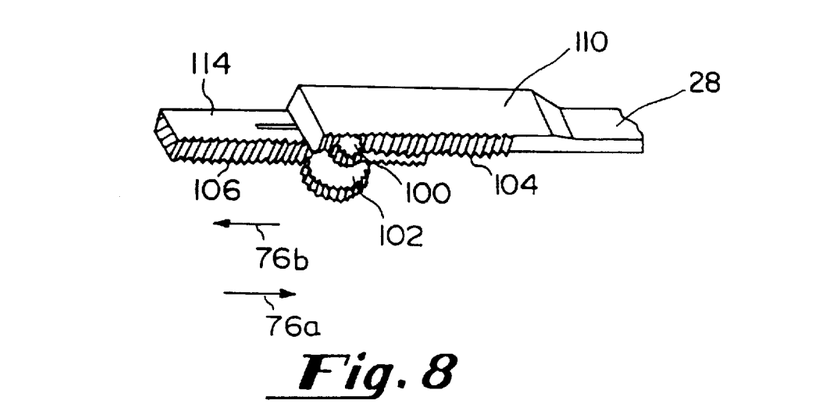
FIG. 8 is an enlarged perspective view showing further details of the gear portion of FIG. 7.

Referring to FIGS. 7 and 8, in a second embodiment of the present invention, a connector 10 includes first and second gears 100 and 102 and first and second worm gears 104 and 106 for transmitting the movement of the push rod to the slidable plate 28. Unlike the releasing mechanism 18 of the first embodiment shown in FIGS. 1 to 6 for transmitting the movement of the memory card 38 to the slidable plate 28 through the pivotal lever 34, a releasing mechanism 18 of FIG. 7 is suited to transmit the movement of a push rod 108 to the slidable plate 28 through the gears 100, 102, 104, and 106. Accordingly, the designs of the push rod and lock member of the second embodiments are different from that of the first embodiment. FIG. 7 mainly shows only portions different from those of the first embodiment.

In FIG. 7, a push rod 108 of the second embodiment includes a front portion 36a (not shown in FIG. 7) constituted by a forked member 60 and a linear member 74 continuous to it in the same manner as in the first embodiment, a substantially linear intermediate portion 110 formed separately of the front portion 36a and coupled to one side portion of the slidable plate 28, and a rear portion 112 formed separately of the front portion 36a and the intermediate portion 110 and including a substantially L-shaped operating member 114 and a coil spring 70. In the same manner as in the first embodiment, the distal end of the coil spring 70 is fixed to a hollow projection 72 (not shown in FIG. 7) of a frame 14, and the rear end thereof abuts against the front end of the operating member 114.

The first worm gear 104 is formed on the outer side surface of the intermediate portion 110 of the push rod 108 of the second embodiment along moving directions 76a and 76b of a memory card 38 (not shown in FIG. 7). The first gear 100 is arranged to be able to mesh with the first worm gear 104. The second gear 102 having a larger diameter than that of the first gear 100 is arranged on the lower surface of the first gear 100 to be coaxial with the first gear 100. The rotating shafts of the first and second gears 100 and 102 are mounted to the housing 12 (not shown in FIG. 7).

The outer side surface of the substantially L-shaped operating member 114 of the second embodiment has a knob 66 similar to that of the operating member 68 of the first embodiment. The second worm gear 106 is formed on the inner side surface of the elongated portion of the operating member 114 along the moving directions 76a and 76b of the memory card 38. The second gear 102 described above can mesh with the second worm gear 106. Accordingly, when the operator pushes the knob 66 of the operating member 114 of the push rod 108 in the forward direction 76a, the slidable plate 28 moves in the backward direction 76b through the gears 100, 102, 104, and 106, and the memory card 38 is discharged through a housing opening 14a (not shown in FIG. 7) in the same manner as in the first embodiment.

When the knob 66 of the operating member 114 is pushed in the backward direction 76b as shown in FIG. 8, the slidable plate 28 also moves in the backward direction.

In this second embodiment, the force required for discharging the memory card 38 and the moving distance of the push rod 108 can be selected by arbitrarily setting the gear ratio of the gears 100 and 104, and 102 and 106. When the force required for discharging the memory card 38 is set comparatively large, even if the push rod 108 is erroneously operated or receives an unexpected vibration or shock, the memory card 38 and the connector are prevented from being undesirably disconnected from each other, in the same manner as in the first embodiment. When the moving distance of the push rod 108 is appropriately set, the push rod 108 will not project through the housing opening 14a, in the same manner as in the first embodiment, and the entire length of the connector 10 can be designed to be comparatively short.

Figure 9:
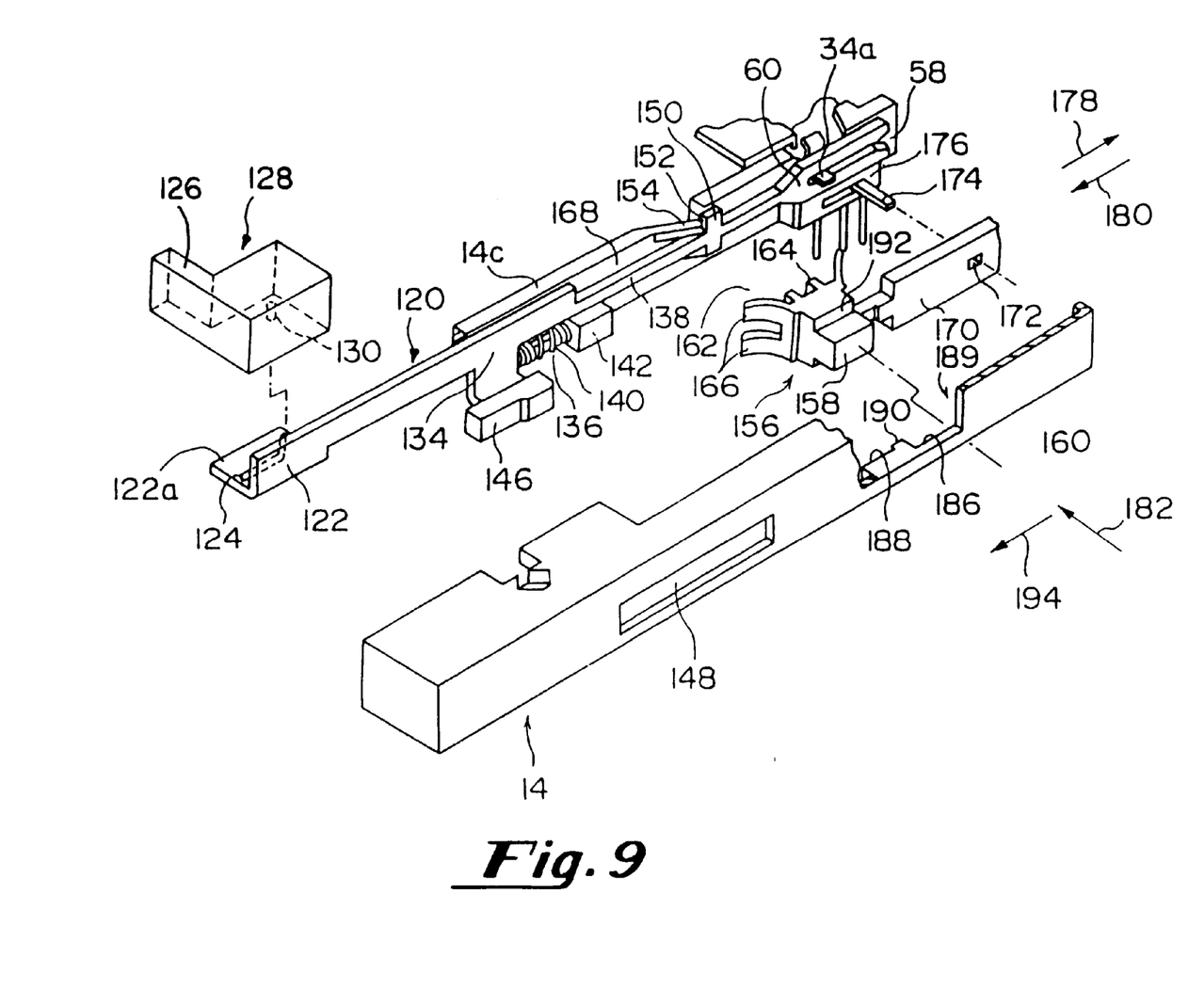
FIG. 9 is an exploded perspective view partially showing a data processing medium connector according to a third embodiment of the present invention.

FIG. 9 shows a third embodiment of the present invention. The same constituent elements as those in the first embodiment are denoted by the same reference numerals as in the first embodiment. The major difference between this embodiment and the first embodiment is the structures of the releasing mechanism and the locking mechanism.

In the third embodiment, a push rod 120 is made of a metal, one end 122 of the push rod 120 on the housing opening side is formed to have an L-shaped section, and a guide groove 124 is formed in a proximal portion 122a of the one end 122.

In the first embodiment, the lock member 78 is moved as the projection 90 of the transmission shaft 92 is guided in the guide groove 84 of the lock member 78. In the third embodiment, a lock member 126 is moved as a projection 130 of a transmission shaft 128 is guided in the guide groove 124 of the metal push rod 120. The operating principle of this movement is the same as that of the first embodiment. Note that the guide groove 124 of the third embodiment is longer than the guide groove 84 of the first embodiment.

Figure 10:
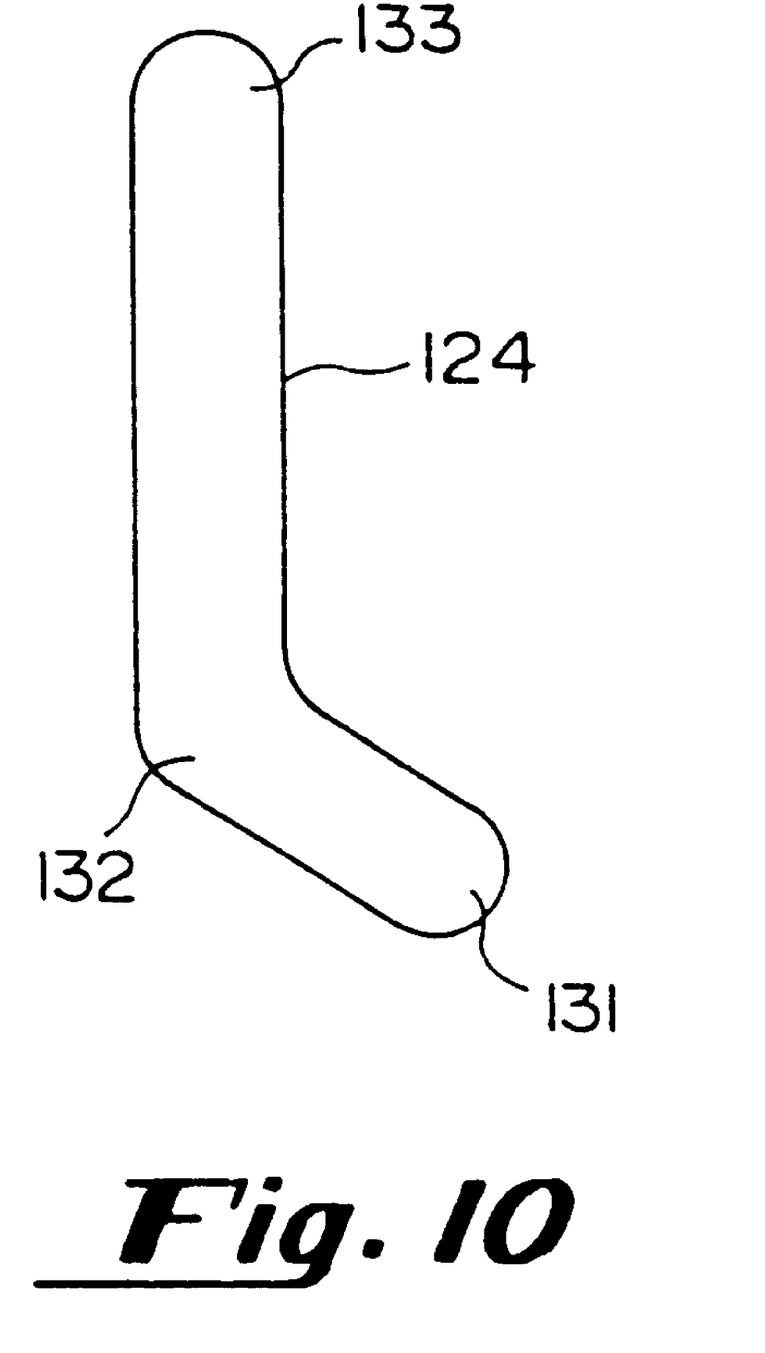
FIG. 10 is a plan view showing the guide groove of the connector shown in FIG. 1.

As shown in FIG. 10, the guide groove 124 of the third embodiment extends from a first position 131 as the standby position of the projection 130 (FIG. 9) of the transmission shaft 128 to a second position 132 obliquely forward the first position 131, and then from the second position 132 to a third position 133 to be parallel to the central line of the push rod 120 and the moving direction of the memory card. The characteristic feature of this embodiment is that a groove is formed to extend from the second position 132 to the third position 133.

When the projection 130 of the transmission shaft 128 is at the first position 131 in the guide groove 124, the lock member 126 is in the forward position. More specifically, the lock member 126 interferes with loading and unloading of a memory card 38. When the projection 130 is at the second position 132, the lock member 126 is at a retracted position and does not interfere with loading and unloading of the memory card 38. When the push rod 120 is further pushed in, the projection 130 of the transmission shaft 128 moves from the second position 132 to the third position 133 in the guide groove 124. At this time, the second and third positions 132 and 133 are parallel to the central line of the push rod 120 and the moving direction of the memory card. Thus, even when the position of the projection 130 changes between the second and third positions 132 and 133, the lock member 126 is always at the retracted position, and does not interfere with loading and unloading of the memory card 38.

The other end of the push rod 120 forms a second forked portion 134 constituted by an elongated member 136 and a short member 138, and the short member 136 is inserted in a coil spring 140. The header-side end portion of the coil spring 140 is pressed against a spring fixing member 142 opposite to the short member 136 of the push rod 120. The spring fixing member 142, is integrally formed by molding with a plastic frame member 14c. Since the header-side end portion of the coil spring 140 is pressed against the spring fixing member 142, the push rod 120 is always biased in the direction 194.

A knob 146 for manually sliding the push rod 120 in the loading/unloading direction of the memory card is provided between an L-shaped end 122 and the short member 138 of the push rod 120. The knob 146 projects to the outside of the connector through a push rod window 148 of the frame 14.

A cross-shaped member 150 is provided on the elongated member 138 of the push rod 120, and the housing opening-side side surface of the cross-shaped member 150 has a pair of upper and lower shoulders 152. A pair of upper and lower lances 154 are integrally formed by molding at portions of the plastic frame member 14c in the vicinities of the shoulders 152 to correspond to the pair of upper and lower shoulders 152. Each lance 154 abuts against the corresponding shoulder 152. The lances 154 have elasticity as they are thin, elongated plastic rods. When the distal ends of the lances 154 are pushed, they are disengaged from the shoulders 152 and bent toward the memory card housing space.

While the projection 130 of the lock member 126 is at the second position 132 in the guide groove 124, the push rod 120 is biased in the backward direction (the discharging direction of the memory card) by the coil spring 140. However, since the lances 154 abut against the shoulders 152 of the push rod 120, the push rod 120 cannot move further backward and is held at this position.

A plastic lock button 156 is arranged near the lances 154. One side surface of the lock button 156 forms a knob 158. This knob projects through a lock button window 160 of the frame 14, and the operator can operate the lock button 156 with his finger. The lock button window 160 will be described in detail later.

The other side surface of the lock button 156 has an engaging portion 162 engageable with the cross-shaped member 150 of the push rod 120. This engaging portion 162 is constituted by four projections 164 (only two are shown in FIG. 9). One side surface of the lock button 156 further has two pairs of upper and lower thin, elongated elastic legs 166. Each pair of legs 166 are opened in a v-shape manner.

Usually, the engaging portion 162 does not contact the shoulders 152 of the push rod 120 but is located slightly aside the shoulders 152. This corresponds to a non-locking state (to be described later). At this time, the legs 166 of the lock button 156 contact a vertical surface 168 of the frame member 14c. A switch driving rod 170 is connected and fixed to the lock button 156. The switch driving rod 170 has a through hole 172, and a switch lever 174 of a switch 176 is inserted in this through hole 172. Along with the movement of the lock button 156 and the switch driving rod 170 coupled to it, the switch lever 174 can move in the loading/unloading directions of the memory card, thereby turning on/off the switch 176.

When the lock button 156 moves in the direction of an arrow 178 together with the switch driving rod 170, the switch lever 174 inserted in the through hole 174 of the switch driving rod 170 also moves in the direction of the arrow 178. In this state, the switch 176 is turned off. On the other hand, when the lock button 156 moves in the direction of an arrow 180, the switch lever 174 also moves in the direction of the arrow 180 to turn off the switch 176, thereby transmitting a signal, indicating that locking is completed, to the data processing apparatus.

When the operator depresses the lock button 156 with his finger in the direction of an arrow 182, the two projections 164 (only one is shown) of the engaging portion 162 at the housing opening side elastically push the pair of lances 154 to cancel abutment of the lances 154 with the shoulders 152. Simultaneously, the engaging portion 162 of the lock button 156 is engaged with the cross-shaped member 150 of the push rod 120, and thus the push rod 120 cannot move. At this time, the V-shaped legs 166 of the lock button 156 contacting the vertical surface 168 of the frame member 14c are arcuated such that their V-shaped open ends are wide open, and abut against the vertical surface 168 more strongly. In this state, when the operator removes his finger off the lock button 156, the lock button 156 is biased in a direction opposite to the arrow 182 by the elasticity of the legs 166. Then, engagement of the engaging portion 162 and the cross-shaped member 150 is canceled, and the lances 154 abut against the shoulders 152 of the cross-shaped member 150 again, thereby stopping movement of the push rod 120 in the backward direction.

The lock button window 160 of the frame 14 is designed in connection to the movement of the lock button 156. An inner side surface 184 of the frame 14 defining the lock button window 160 has a thin portion 186 and a thick portion 188 along the discharging direction of the memory card, and a projection 190 is formed between the thin and thick portions 186 and 188.

A shoulder 192 is formed at the base portion of the knob 158 of the lock button 156. This shoulder 192 abuts against the thin portion 186 of the frame 14. Since the abutting shoulder 192 is biased by the elasticity of the V-shaped legs 166, the lock button 156 is stably located at a predetermined position.

The operation of the connector 10 of the third embodiment will now be described.

The operator confirms that the locking mechanism is in the non-locking state, and inserts a memory card into the memory card housing space. Subsequently, when the operator sufficiently depresses the lock button 156 in the direction of the arrow 182, the engaging portion 162 of the lock button 156 is engaged with the cross-shaped member 150 of the push rod 120 in the manner as described above, thereby pushing the push rod 120 in the direction of the arrow 182. Simultaneously, the shoulder 192 of the lock button 156 is disengaged from the thin portion 186 of the frame 14 and slightly passes over the projection 190 between the thin and thick portions 186 and 188. At this time, when the operator changes the operating direction of the lock button 156 and slides the knob 158 of the lock button 156 in a direction indicated by an arrow 194, the shoulder 192 of the lock button 156 completely moves over the projection 190 and abuts against the thick portion 188 of the frame 14. Even if the operator removes his finger off the lock button 156 in this state, the engaging portion 162 of the lock button 156 stays to be engaged with the cross-shaped member 150 of the push rod 120, so that the push rod 120 is held at the locked state. Simultaneously, since the lock button 156 moves in the direction of the arrow 194, the projection of the lock member 156 also moves from the second position 132 to the first position 131, thereby locking the memory card.

In order to unlock the locked memory card, the lock button 156 is pushed in a direction opposite to the arrow 194. When the lock button 156 is located at the thin portion 186 of the frame 14, the knob 158 of the lock button 156 naturally projects through the lock button window 160 because of the elasticity of the V-shaped legs 166. At this time, the engaging portion 162 of the lock button 156 and the cross-shaped member 150 of the push rod 120 are disengaged from each other, and the projection 128 of the lock member 126 moves to the second position 132. In this state, the push rod 120 can be moved by the knob 158 in the direction of the arrow 194, so that the memory card can be discharged.

According to this embodiment, the lock button 156 is operated in two directions. Then, the operation becomes complicated as compared to a case wherein the lock button 156 is operated in one direction, thereby reducing an erroneous operation by the operator.

The present invention is not limited to the above embodiments, and various changes and modifications may be made without departing from the spirit and scope of the invention. For example, although the releasing mechanism 18 is provided only on the right side surface of the housing 12 of the connector 10 in the above embodiment, the releasing mechanism(s) 18 may be provided on the left and/or right side surface of the housing 12 as required. In place of one connector 10, a plurality of connectors 10 may be stacked, and a plurality of memory cards 38 may be connected to them.

Alternatively, when a system having a plurality of data processing apparatuses is used, the connector 10 of the present invention is mounted to at least one of the apparatuses, and communication of electric signals between the switch 94 and the connector 10 and the processing step of the signal by a program may be executed by other data processing apparatuses.

The data processing medium locking mechanism of the present invention, comprising the lock member 78 having the guide groove 84 and the pin projection 90 that moves in the guide groove 84, can not only be applied to the connector 10 described above and shown in the drawings, but also can be widely used in connectors or connector systems for connecting any type of data processing medium.

The data processing medium used in the connector 10 of the present invention is not limited to a memory card, but various other types of media, e.g., various types of integrated circuit (IC) cards, hard disk drive packages incorporating low-profile hard disk drives, and the like may be used in the connector 10. A data processing medium of these types may have contact terminals not only at its one end face but also at its plurality of end faces.

The combination of the first and second contact terminals in the present invention may be male terminals and female terminals, or vice versa.

Accordingly, the present invention is not limited to the particular embodiments disclosed, but is intended to cover all modifications that are within the spirit and scope of the invention as defined by the appended claims.

I claim:

1. A connector apparatus for a card-like data processing medium comprising:

a frame having opposing side rails spaced at an interval substantially equal to a width of the card-like data processing medium for guiding the card-like data processing medium during insertion into the connector apparatus;

a header coupled to said frame and having a plurality of contact terminals arranged to connect with a card-like data processing medium inserted in the connector apparatus;

a substantially planar slidable plate movably mounted on said frame in a plane substantially parallel to a plane defined by said frame, said slidable plate being operable to slide toward and away from said header and having a pawl adapted to engage a forward end face of the card-like data processing medium;

a push rod slidably mounted on one of said side rails and being operative to slide lengthwise of said one side rail toward and away from said header; and a substantially planar pivotal lever rotatably mounted on said frame in substantially the same plane as the slidable plate, one end of said pivotal lever being coupled to said slidable plate and the other end of said pivotal lever being coupled to said push rod, whereby movement of the push rod in one direction is translated through rotation of said pivotal lever into movement of the slidable plate in an opposite direction.

2. A connector apparatus according to claim 1 further comprising means for locking said push rod in place to prevent movement thereof, thereby preventing inadvertent ejection of the card-like data processing medium from the connector apparatus.

3. A connector apparatus according to claim 1 wherein said frame has an open end through which the card-like data processing medium is inserted and a closed end, and wherein the push rod does not project from the open and closed ends of said housing as the push rod moves lengthwise of the side rail of said frame toward and away from said header.

4. A connector apparatus according to claim 1, wherein the card-like data processing medium comprises an integrated circuit card.

5. A connector apparatus according to claim 1, wherein the card-like data processing medium comprises a package incorporating a hard disk.

6. A connector apparatus according to claim 1, wherein said frame is substantially U-shaped.

7. A connector apparatus according to claim 1 wherein said substantially planar slidable plate and said substantially planar pivotal lever have substantially the same thickness.

8. A connector apparatus for a card-like data processing medium comprising:

a frame having opposing side rails spaced at an interval substantially equal to a width of the card-like data processing medium for guiding the card-like data processing medium during insertion into the connector apparatus;

a header coupled to said frame and having a plurality of contact terminals arranged to connect with a card-like data processing medium inserted in the connector apparatus;

a substantially planar slidable plate movably mounted on said frame in a plane substantially parallel to a plane defined by said frame, said slidable plate being operable to slide toward and away from said header and having a pawl adapted to engage a forward end face of the card-like data processing medium;

a push rod slidably mounted on one of said side rails and being operative to slide lengthwise of said one side rail toward and away from said header;

a substantially planar pivotal level rotatably mounted on said frame in substantially the same plane as the slidable plate, one end of said pivotal lever being coupled to said slidable plate and the other end of said pivotal lever being coupled to said push rod, whereby movement of the push rod in one direction is translated through rotation of said pivotal lever into movement of the slidable plate in an opposite direction;

a lock member movably mounted on said one side rail proximate said push rod, said lock member moving in a widthwise direction of said connector apparatus and having a projection that releasably engages said push rod;

a transmission shaft slidably mounted on said one side rail substantially parallel to said push rod and being operative to slide lengthwise of said one side rail; and means coupling one end of said transmission shaft to said lock member, movement of said transmission shaft in a first lengthwise direction being transmitted through said coupling means into movement of said lock member in said widthwise direction, whereby the projection on said lock member engages said push rod to prevent operation of said push rod;

whereby the lock member, the transmission shaft, and the coupling means lock said push rod in place to prevent movement thereof, thereby preventing inadvertent ejection of the card-like data processing medium from the connector apparatus.

9. A connector apparatus according to claim 8 wherein said coupling means comprises:

a guide groove formed in said lock member; and a projection formed on said one end of said transmission shaft, said projection being mounted in said guide groove, said guide groove being contoured such that movement of said projection along said guide groove causes said lock member to move in said widthwise direction.

10. A connector apparatus according to claim 8 wherein said locking means further comprises a lever attached to said transmission shaft to facilitate sliding of said transmission shaft in said lengthwise direction.

11. A connector apparatus according to claim 10 wherein said push rod has an operating member for moving and operating said push rod, and wherein both the lever of said locking means and the operating member of said push rod are located on a same side rail of said frame.

* * * * *